United States Patent [19]
Yarnell et al.

[11] Patent Number: 5,359,729
[45] Date of Patent: Oct. 25, 1994

[54] METHOD FOR SEARCHING FOR A GIVEN POINT IN REGIONS DEFINED BY ATTRIBUTE RANGES, THEN SORTED BY LOWER AND UPPER RANGE VALUES AND DIMENSION

[75] Inventors: David F. Yarnell, Lynnwood; Donald E. Schuy, Kirkland, both of Wash.

[73] Assignee: Timeline, Inc., Bellevue, Wash.

[21] Appl. No.: 162,839

[22] Filed: Dec. 3, 1993

[51] Int. Cl.5 .............................................. G06F 15/40
[52] U.S. Cl. .................... 395/600; 395/155; 395/11; 364/DIG. 1; 364/408; 364/222.9; 364/223; 364/224.3; 364/246.3; 364/282.1; 340/146.2
[58] Field of Search ............... 364/408; 395/600, 155, 395/11; 340/146.2

[56] References Cited

U.S. PATENT DOCUMENTS

| | | | |
|---|---|---|---|
| 4,398,249 | 8/1983 | Pardo et al. | 364/300 |
| 4,633,430 | 12/1986 | Cooper | 364/900 |
| 4,873,513 | 10/1989 | Soults et al. | 345/27 |
| 4,989,141 | 1/1991 | Lyons et al. | 364/408 |
| 5,033,009 | 7/1991 | Dubnoff | 364/523 |
| 5,055,998 | 10/1991 | Wright et al. | 364/200 |
| 5,093,907 | 3/1992 | Hwong et al. | 395/152 |
| 5,133,052 | 7/1992 | Bier et al. | 395/155 |
| 5,150,381 | 9/1992 | Fourney, Jr. et al. | 375/39 |
| 5,159,678 | 10/1992 | Wengelski et al. | 395/425 |
| 5,189,608 | 2/1993 | Lyons et al. | 364/408 |
| 5,263,120 | 11/1993 | Bickel | 395/11 |

OTHER PUBLICATIONS

Stanley, Y. W. Su, Database Computers, McGraw-Hill, 1989, pp. 250-254.
Amsterdam, "Build A Spreadsheet Program", Byte pp. 97-106 (1986).

*Primary Examiner*—Thomas C. Lee
*Assistant Examiner*—Wayne Amsbury
*Attorney, Agent, or Firm*—Christensen, O'Connor, Johnson & Kindness

[57] ABSTRACT

Regions, such as those determined by attributes in a spread sheet, are defined by ranges of attribute values. Regions are distinct if they differ in their number of ranges (dimension) or because a pair of corresponding ranges fail to overlap. A region is located for a given point by: (1) sorting the regions by lower range value and dimension to form list A, then by upper range and dimension to form list B, (2) paring lists A and B to sublists of the dimension of the point, and (3) searching the shorter of the pared lists.

11 Claims, 2 Drawing Sheets

METHOD FOR SEARCHING FOR A GIVEN POINT IN REGIONS DEFINED BY ATTRIBUTE RANGES, THEN SORTED BY LOWER AND UPPER RANGE VALUES AND DIMENSION

This application is a continuation application based on prior copending application Ser. No. 07/707,885, now abandoned, filed on May 31, 1991.

FIELD OF THE INVENTION

The present invention relates to data processing techniques and, in particular, to a technique for sorting and searching data tables and for using tables to streamline the operation of an electronic spreadsheet,

BACKGROUND OF THE INVENTION

Electronic spreadsheets have become well known tools for manipulating information with a computer. A conventional (non-electronic) spreadsheet typically consists of numeric data arranged in rows and columns. A spreadsheet for tabulating expenses, for example, might associate each row with a different expense type, and each column with a different time period. The spreadsheet would typically include row totals showing the total of each expense type over time, and column totals showing the total expense for each time period.

An electronic spreadsheet is a computer program for creating, modifying and displaying spreadsheets. Like its non-electronic counterpart, a conventional electronic spreadsheet organizes data in a two-dimensional pattern of rows and columns. Each intersection of a row and a column is termed a cell. The electronic spreadsheet can store numbers and data strings in each cell, as well as formulas for computing a value based upon values contained in other cells.

When the electronic spreadsheet program displays a spreadsheet, either on a computer screen or in a printed report, the electronic spreadsheet does not display the data in the cell itself. Rather, the electronic spreadsheet interprets the contents of each cell, and displays the results, For example, if a cell contains numeric or string data, then such data is displayed, modified by any attribute information associated with the cell. Attribute information may specify the number of decimal places for numeric values, the format for displaying a date value, etc. A formula may also be regarded as an attribute of a cell. When a cell contains a formula, the electronic spreadsheet evaluates the formula, and displays the result, according to whatever additional attribute information is associated with the cell.

In prior electronic spreadsheets, data specifying the attributes associated with a cell (e.g., formats, equations, etc.), or pointers to such data, has been stored in the cell itself. The principle reason for this has been execution speed, so that the spreadsheet program can immediately locate the required attributes whenever a cell is to be displayed. However the disadvantage of storing attribute information in cells is that a significant amount of storage is required. This is particularly the case where a particular attribute applies to all cells in a range. In a conventional spreadsheet program, each cell in the range must contain a reference to the attribute.

SUMMARY OF THE INVENTION

The present invention provides an improved electronic spreadsheet that includes one or more attribute tables stored separately from the cell data, and an improved method for sorting and searching the attribute table.

In a first aspect, the invention provides a method for searching a table to determine whether a search item is in the table. The table comprises a plurality of table items, one or more of which comprises a range having upper and lower orderable values, e.g., upper and lower cell addresses. The table is first sorted using the lower value of each range, to produce a first sorted list. The table is again sorted using the upper value of each range, to produce a second sorted list. The first sorted list is searched, for example using a binary search, to determine a lower limit comprising the largest value less than or equal to the search item. The second sorted list is also searched, to determine an upper limit comprising the smallest value greater than or equal to the search item. The number of table items above the lower limit in the first sorted list is then compared with the number of table items below the upper limit in the second sorted list, to determine which number is smaller. The list having the smallest number is then elected, and the remaining portion of the elected list is then searched, for example using a linear search, for the search item. Application of this techniques is described for an embodiment in which each of a plurality of indices, i.e., dimensions, can be indicated by a range.

In a second aspect, the invention provides an improved method of associating attributes with cells in an electronic spreadsheet. The method comprises maintaining an attribute table separate from the data stored in the cells. The attribute table comprises one or more attribute records, each of which includes attribute data, and address data indicating the cells with which the attribute is associated. When a cell is to be displayed, the attribute table is searched using the cell address, to determine the attribute (if any) associated with that cell. The sorting and searching method described above is preferably used to search the attribute table, particularly in the case where the attribute table may comprises ranges of addresses.

DETAILED DESCRIPTION OF THE INVENTION

Figures 1, 2:
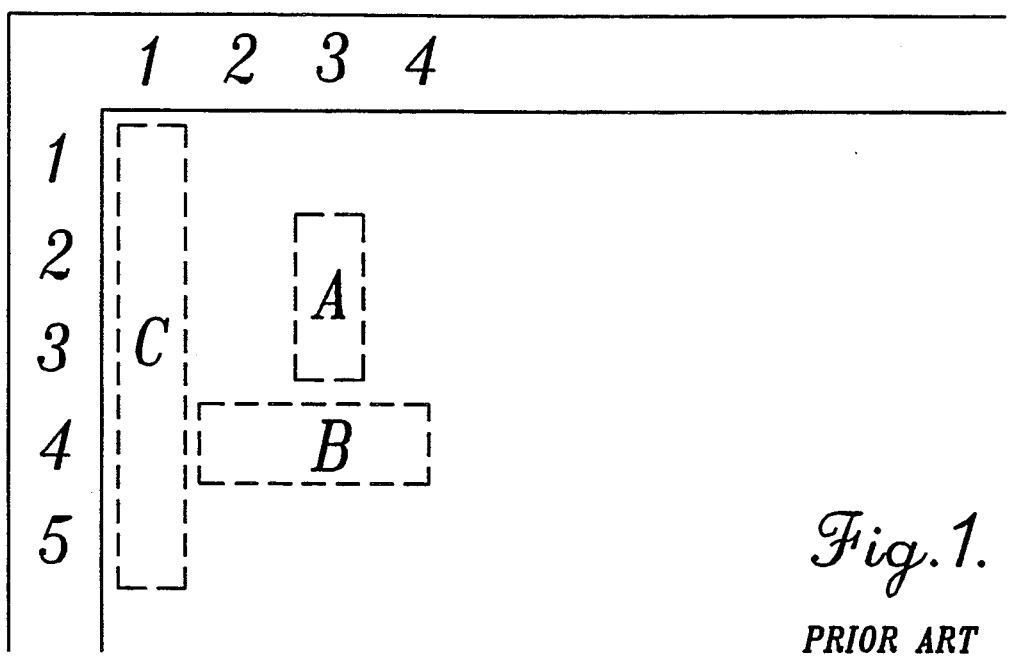
FIG. 1 illustrates a spreadsheet display in which attributes are associated with particular cells.
FIG. 2 illustrates an attribute table.

The four basic spreadsheet cell types are blank, number, string, and error. These are the only cell types in most spreadsheets. Five additional cell types are unique to the present invention (as cell types), and allow multi-dimensional range equations to be effectively stored and used. These new cell types are address, range, list, function, and macro.

List cells allow for multi-dimensional data, allowing any cell to contain any size of multi-dimensional tree of data ( e.g., up to 65535 wide with no limit on depth apart from addressability by addresses and ranges). Address cells point at individual cells by looking into a list cell, pointing to a numbered item within a list, then a numbered item within that sub-list, etc., up to 65535 "dimensions" (or "sub-lists"). Range cells point at a multi-dimensional range of cells, pointing to a contiguous set of cells within the list at each level. Ranges can be considered as bounded by two multi-dimensional addresses. In particular, in a range cell, at least one index or dimension of the address refers to a range of that index, rather than to a single value of the index. Range cells are important in the context of the present invention, because the invention provides an efficient technique for sorting and searching a table containing such ranges. The ability of an efficient sorting and searching technique allows the use of attribute tables containing such ranges, so that a single attribute table record can encode the attributes of a large number of individual cells.

Functions are program code that perform actions and/or return results (any of the nine cell types). Macros are coded in a macro programming language which combines the nine cell types, allowing macros to be defined as any of the cell types, combining them when using lists, functions, and macros as the macro definition. Storing functions and macros as individual cell types is unique to the present invention.

To demonstrate list, address, and range cells, consider the following outline form of a list (which can also be shown as a tree or by using parentheses):

```
1.  "ABC"
2.
    1.  "DEF"
    2.  123
    3.  ?This is an error?
3.
    1.
        1.  SUM(A1 ... A100)
        2.
            1.  "First"
            2.  "Second"
        3.  456
    2.  RESPONSE("This is the argument of a macro")
4.  "XYZ"
```

This information is contained in one list cell which has a "length" of 4 (looking at the leftmost numbers). The first item in the list is a simple string ("ABC"). The second item in the list is another list, also of length 3. The third item in the list is another list of length 2, where the first item in that list is a further list having the Function (SUM) as its first item, the second item is a list of length 2 ("First" and "Second"), and the third is a simple number (456).

An address can point at any cell at any level within this single list cell by referring to the numbers at each level, where each level represents another "dimension". [1] points to "ABC". [2] points at a list, indicating more dimensions, so that [2,1] points to "DEF", [2,2] to 123, and [2,3] to the error "?This is an error?." [3] points to a list. [3,1] also points to a list. [3,1,1] points to the SUM-(A1..A100) function. [3,1,2] points to a list. [3,1,2,1] points to "First". [3,1,2,2] points to "Second". [3,2] points to the macro RESPONSE("This is the argument of a macro").

The higher level List at [3,1,2] contains the list ("First", "Second"). The list at [3] is ((SUM(A1.-.A100),("First","Second"),456),RESPONSE("This is the argument of a macro")). Note the use of parentheses to describe levels in a list.

The tree form of this list cell is:

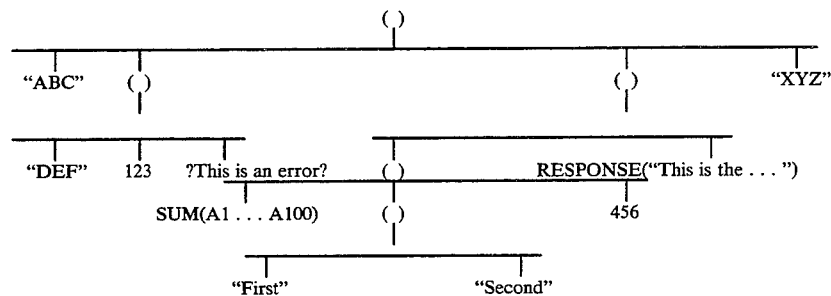

Attribute Tables

Attribute tables allow any cell to be tied to any other cell through addresses and ranges. Cell [5,3,4,2] may contain a 10 as the result of an equation, formatted to look a certain way, protected against direct entry, with some help on the cell available on request. The equation, format, protection, and help information are all cells tied to the cell [5,3,4,2] through attribute tables.

The possible overlap among multi-dimensional ranges is what makes sorting and searching the records in the attribute table difficult. This sort/search method for ranges including multi-dimensional ranges, is the subject of this section of the application.

Addresses and ranges are sorted left and right, where the left sort uses the left side addresses of the ranges, and the right sort uses the right side addresses of the ranges. The left sort is stored using the addresses and ranges in the first column of the attribute table. The second column of this table contains numbers that point at the first column addresses and ranges, to represent the right sort. The third column of the table contains the attribute associated with the address or range listed in the first column.

Each sort is done first by the number of dimensions, so that addresses with fewer dimensions go to the top. Next, the dimensions of each address are compared from left to right. In a preferred embodiment, there will not be an exact match, i.e., there will be no two identical Addresses (or overlapping ranges), because there will be only one attribute setting per address in a given attribute table. Therefore two addresses can always be identified using a less-than or greater-than relationship, allowing for a binary sort (one such sort for the left side and the right side of the ranges where the same addresses are used in each sort).

Searching is always done by address (not by range). Two binary searches are done (left and right) in order to set limits which may then be used in a linear search. The binary searches are done by the number of dimensions, then using the dimensions within the addresses being sought.

If there ever is an exact match then the search is done (having found the goal), otherwise one or both of the limits set by the searches are used in a linear search, where the addresses and ranges above the limit in the first column are possible matches, whereas the addresses and ranges below the limit in the second column are possible matches. The shorter of the two sets of possible matches are searched linearly until a match (or no match) is found.

The first line of an attribute table is preferably reserved for a default attribute which may be stored in the third column (in the first row) above the other attributes. A combine function/macro is stored in the second column (in the first row), and represents a function or macro to use in determining how to replace one attribute with another, where three cells are passed to the function/macro: the original attribute, the new attribute, and the default attribute. The result of the function/macro is what is used as the new attribute for the address/range. If no function/macro is specified, simple replacement is used (ignoring the original and default attributes). This method is useful for format attributes in particular.

These concepts may be clarified by reference to FIGS. 1 and 2. Referring initially to FIG. 1, a portion of a spreadsheet display is illustrated, comprising rows 1–5 and columns 1–4. It is assumed that it is desired to associate attribute A with cells [2,3] and [3,3], attribute B with cells [4,2] through [4,4], and attribute C with cells [1,1] through [5,1]. As previously described, attributes A-C may comprise spreadsheet equations, formats, protection codes, help text, decimal positioning, or any other attributes pertinent to the operation of a spreadsheet program.

In a conventional spreadsheet, this association of attributes with cells would be accomplished by inserting either an attribute code (or a pointer to an associated attribute) in the cell itself. In the present invention, the association of attributes with cells is performed by a separate attribute table that preferably has the form shown in FIG. 2. The attribute table includes a "Left" column, a "Right" column, and an "Attribute" column. The Attribute column stores data designating the attributes, in this case A, B and C. The first row of the attribute table is reserved as described above, with the third column of the first row containing a default attribute for the case in which an address is not found in the attribute table. Preferably, there is a separate attribute table for each type of attribute, e.g., an equation attribute table, a format attribute table, etc.

For each row of the attribute table, the Left column contains a designation of the address or range of addresses to which the attribute in the Attribute column of that row applies. For example, the second row of the attribute table indicates that attribute C applies to the cells in column 1, rows 1–5. The attribute table is maintained sorted by the spreadsheet program by the addresses and ranges in the Left column, the sort order being the number of dimensions, then the first index, then the second index, etc. For each index that comprises a range such as 1..5, the sort is performed by the left-hand (i.e., lower limit) of the range.

The Right column in the attribute table represents a sort of the addresses and ranges shown in the left column, except that the sort order is based upon the right-hand limit of each range. Thus, for example, for the first (row) index, the right-hand limits for the second, third and fourth attribute table entries (addresses) are 5, 3 and 4, respectively. Thus, the sort order in the Right column is as indicated in FIG. 2.

The maintenance of an attribute table containing sorts by both left and right range limits permits efficient sorting and searching of the attribute table, in order to determine whether a given cell has an attribute associated with it. In a preferred embodiment, a first step is to perform a binary search of the Left column of the attribute table for a given search address, using the left hand address of each range. By way of illustration, if the search address is [3,2] then the binary search will determine that the search address lies between the third attribute table record (having a left address for the first index of 2) and the fourth attribute table record (having a first index address of 4). The result of this first search is the setting of a lower limit which can be visualized as being placed between the third and fourth attribute table records. The lower limit designates the portion of the first column (here attribute records 2 and 3) that may contain the search address.

In the next step, a binary search is performed on the right column, using the right-hand limit of each range, to determine an upper limit equal to the smallest value greater than or equal to the search item. For this example, all three attribute records have row indices greater than or equal to 3, and the upper limit can be visualized as existing above the second attribute table record. These two binary searches are then compared to determine which search has restricted the possible location for a matching record to the fewest number of attribute table records. For this example, the search of the Left column restricted the number of records to 2, while the search of the right column did not restrict the search at all, i.e., 3 records still remained to be searched. The next step is to select the shorter of these two restricted sub-columns, in this case the Left column, to perform a linear or other type of search upward in the column from the lower limit (or downward from the upper limit for the case of the right column) until a match is found, or until it is determined that no match exists.

Figure 3:
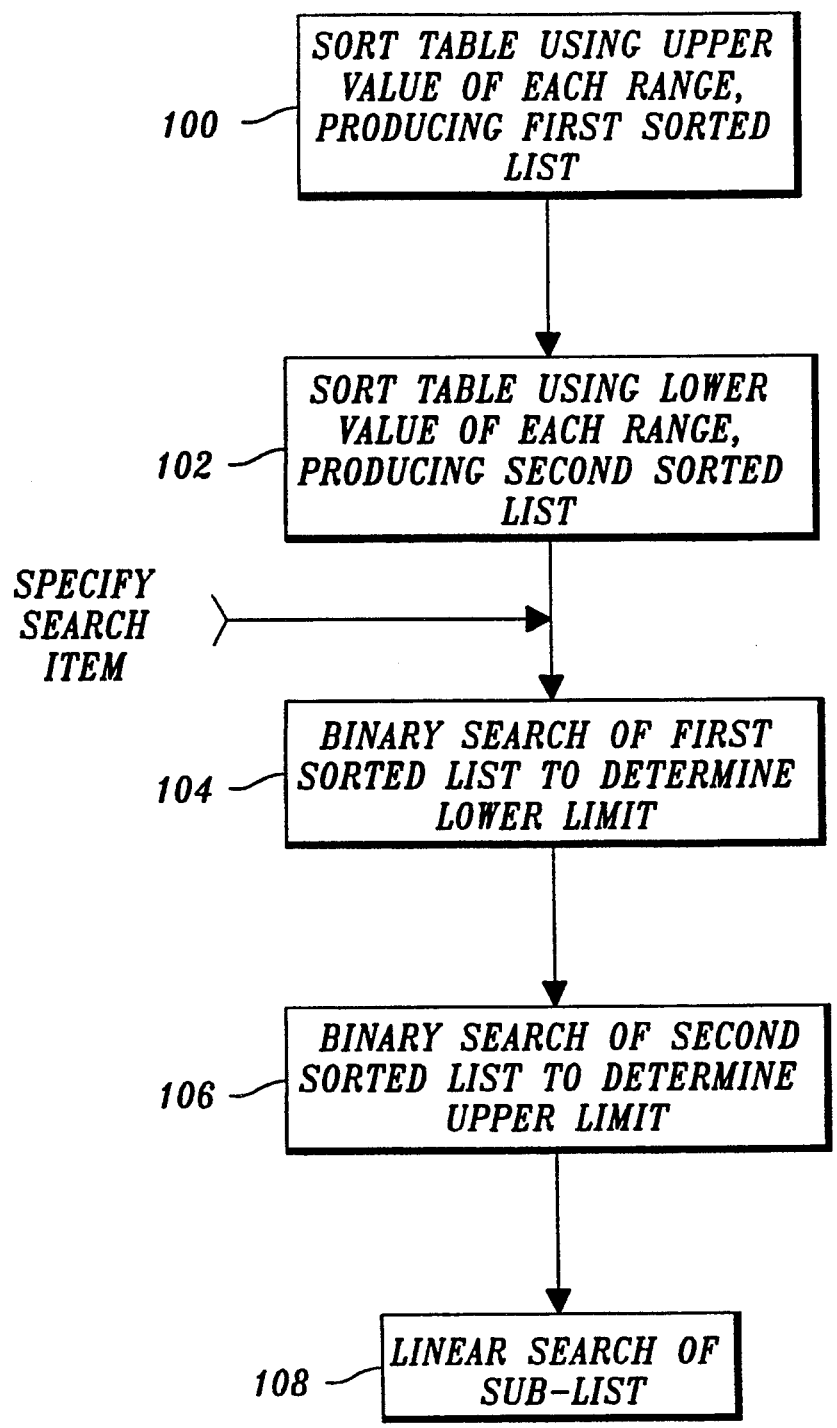
FIG. 3 is a flow chart outlining the search and sorting method.

FIG. 3 summarizes the steps involved in the sorting and searching technique described above. The method begins in step 100 with the sorting of the attribute table using the lower (left) value of each range, to produce a first sorted list corresponding to the Left column of FIG. 2. In step 102, the same data is resorted using the upper (right) value of each range, to produce a second sorted list corresponding to the Right column of FIG. 2. The Right column may consist of the addresses and ranges themselves in the new sort order, or, preferably a pointer to the data in left column as in the preferred embodiment described above. Both variations are encompassed by the term "sorted list".

Subsequently, after a search item (e.g., a cell address) is specified, the first sorted list is searched in block 104 for the search item, to determine a lower limit, i.e., the largest item less than or equal to the search item. If the search item is equal to the lower limit, then of course the search is complete. In step 106, a similar process is done using the second sorted list, to determine an upper limit comprising the smallest address greater than or equal to the search item. Again, if the search item is equal to the upper limit, then the search is complete. Assuming that the search item has not been found in the searches of the Left and Right columns then the upper and lower limits are then compared, to determine the number of items remaining to be searched in each sorted list. The sub-list with the smallest number of items is elected, and finally, in step 108, the elected list is searched, for example, using a linear search, to determine if the search item is in the sub-list. As previously described, each sorting operation takes place first based upon the number of dimensions in an address, then by the value of the first dimension, then the second dimension, etc.

While the preferred embodiments of the invention have been illustrated and described, variations will be apparent to those skilled in the art. Accordingly, the scope of the invention is to be determined by reference to the following claims.

The embodiments of the invention in which an exclusive property or privilege is claimed are defined as follows:

1. A method for computer sorting and making a search of a plurality of regions, each region expressed as at least one range, each range having a lower and an upper value, wherein the lower and upper values may be equal, and no two regions have both the same number of ranges and all corresponding ranges overlap, and wherein the search will determine whether a point, expressed as a plurality of coordinates, is included within one of the regions, the search being successful when both the number of coordinates of the point is equal to the number of ranges in a region and each coordinate of the point is within each corresponding range within the region, comprising the steps of:

(a) creating a first sorted list of the regions by:
  (i) arranging the regions by the number of ranges within each region, and
  (ii) sub-arranging the regions having an equal number of ranges by the lower value of the first range in each region, and for regions having an equal number of ranges and an equal lower value for the first range, proceeding to a comparison of the lower value for each successive corresponding range in the regions until two corresponding lower values are unequal;

(b) creating a second sorted list of the regions by repeating step (a) using the upper values for the ranges instead of the lower values;

(c) performing a preliminary search on the first sorted list to create a first sublist of regions where the point could be located, searching first for regions that have the same number of ranges as the point has coordinates, and thereafter searching said regions having the same number of ranges as the point has coordinates, by comparing coordinate values of the point with the lower values of the corresponding ranges within the regions to identify a region in the first sorted list, wherein all of the preceding regions in the first sorted list could include the point, the first sublist comprising the identified region and all of the preceding regions in the first sorted list;

(d) repeating step (c) using the upper values of the ranges instead of the lower values and the second sorted list instead of the first sorted list, and creating a second sublist of the second sorted list where the point could be located, the second sublist comprising a region identified in the second sorted list, and all of the regions succeeding the identified region in the second sorted list;

(e) comparing the first sublist with the second sublist to determine which sublist is the shorter, or if the sublists are equal in length;

(f) selecting the shorter sublist to linearly search, and if the sublists are equal in length, selecting either sublist; and (g) linearly searching the selected sublist until an item in the selected sublist is found where each coordinate for the point falls within each corresponding range within the region.

2. The method of claim 1, wherein the step of performing a preliminary search on the first sorted list to create a first sublist of regions comprises using a binary search technique.

3. The method of claim 1, wherein the step of performing a preliminary search on the first sorted list to create a first sublist of regions comprises the step of terminating the search if a match is found, wherein a match is a region having the same number of ranges as coordinates of the point, and having a lower value for each range equal to a corresponding value for each coordinate of the point.

4. The method of claim 1, wherein the step of repeating step (c) using the upper value of the ranges instead of the lower value and the second sorted list instead of the first sorted list, comprises the step of terminating the search if a match is found, wherein a match is a region having the same number of ranges as coordinates of the point, and having an upper value for each range equal to the corresponding value for each coordinate of the point.

5. The method of claim 1, wherein the step of repeating step (c) using the upper values of the ranges instead of the lower values and the second sorted list instead of the first sorted list further comprises the step of excluding from the second sublist regions having a number of ranges unequal to the number of coordinates of the point.

6. The method of claim 1, wherein the regions are indicative of addresses in a computer memory.

7. The method of claim 1, wherein the regions are indicative of cells in a spreadsheet.

8. The method of claim 1, wherein the regions are indicative of elements in an array.

9. The method of claim 1, wherein the regions are indicative of areas in a mapping system.

10. The method of claim 1, wherein the method is used to associate attribute data with cells in a spreadsheet, a region being indicative of a zone in a spreadsheet, wherein the cells comprising the zone have at least one identical attribute.

11. The method of claim 10, wherein the search item represents a cell, and a default attribute is associated with the cell if it is determined that the sublist does not correspond to a subset of regions in which the search item is located.

* * * * *